United States Patent
Ohishi

(10) Patent No.: US 9,319,572 B2
(45) Date of Patent: Apr. 19, 2016

(54) IMAGE PICKUP DEVICE

(71) Applicant: JVC KENWOOD Corporation, Yokohama-shi, Kanagawa (JP)

(72) Inventor: Kouji Ohishi, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 0 days.

(21) Appl. No.: 14/289,050

(22) Filed: May 28, 2014

(65) Prior Publication Data
US 2014/0267895 A1 Sep. 18, 2014

Related U.S. Application Data

(63) Continuation of application No. PCT/JP2012/080023, filed on Nov. 20, 2012.

(30) Foreign Application Priority Data

Nov. 29, 2011 (JP) ................... 2011-260629

(51) Int. Cl.
H04N 5/225 (2006.01)
(52) U.S. Cl.
CPC ........... H04N 5/2252 (2013.01); H04N 5/2251 (2013.01); *G03B 2217/002* (2013.01)
(58) Field of Classification Search
CPC .......................... H04N 5/2251; H04N 5/2252
USPC .................................................... 348/333.06
See application file for complete search history.

(56) References Cited

U.S. PATENT DOCUMENTS

2006/0087564 A1* 4/2006 Kawamura ............... 348/211.99
2007/0153120 A1* 7/2007 Kajikawa et al. ............. 348/373

FOREIGN PATENT DOCUMENTS

| EP | 0 444 849 A2 | 9/1991 |
| JP | 2002-314862 A | 10/2002 |
| JP | 2005-115126 A | 4/2005 |
| JP | 2007-324718 A | 12/2007 |
| JP | 2008-109216 A | 5/2008 |
| JP | 2010-139967 A | 6/2010 |
| JP | 2011-139242 A | 7/2011 |

OTHER PUBLICATIONS

Machine English Translation of JP 2010-139967 A (Dec. 15, 2008).*
Search Report issued in European Application No. 12853587.9 dated Aug. 7, 2015.

(Continued)

*Primary Examiner* — Nelson D. Hernández Hernández
(74) *Attorney, Agent, or Firm* — Nath, Goldberg & Meyer; Jerald L. Meyer; Christopher Thomas

(57) ABSTRACT

An image pickup device includes a body case, a grip belt, and a Wi-Fi module stored in the body case. A communication module has a substrate, a processing circuit, and an antenna. The grip belt extends from a first attaching portion provided on a right side surface of the body case to a second attaching portion provided on a side opposite to an opening portion side of a lens barrel of the body case. The communication module is arranged closer to the opening portion of the lens barrel than a reference surface substantially orthogonal to an optical axis and passing through the first attaching portion or in the vicinity of the reference surface.

5 Claims, 7 Drawing Sheets

(56) References Cited

OTHER PUBLICATIONS

Marc Chacksfield, JVC Everio GZ-HM960 Review', http://www.t3.com/reviews/jvc-everio-gz-hm960-review, Apr. 12, 2011.
HD Memory Camera, Detailed User Guide, Getting Started, GZ-HM960/GZ-HM860, Apr. 30, 2011, XP055204306, Retrieved from the Internet: URL:http://manual3.jvckenwood.com/manuals/wse/download.php?filename=/manuals/3730CTksuezxnq/GBLEMDcbimubwn/ENUS/pdf/LYT2339-003A.pdf[retrieved on Jul. 23, 2015].

\* cited by examiner

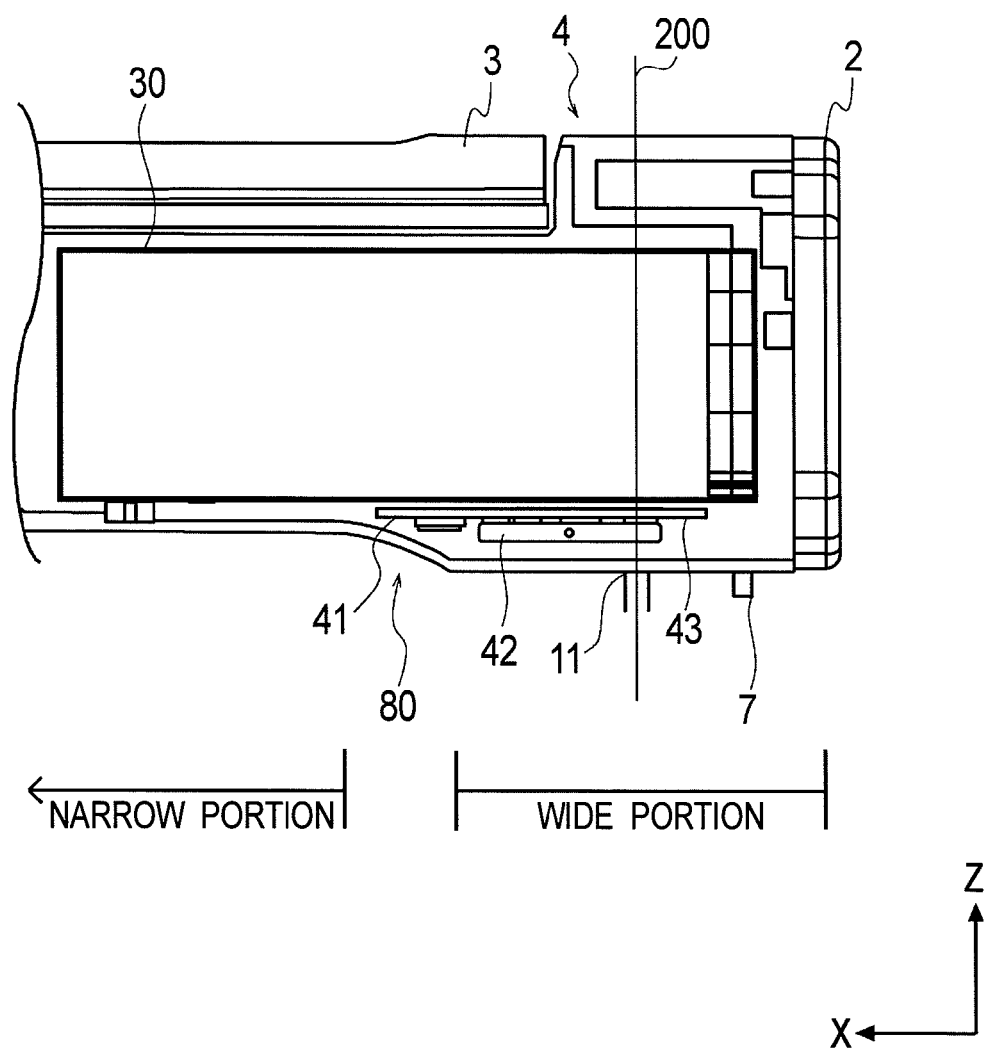

IMAGE PICKUP DEVICE

CROSS REFERENCE TO RELATED APPLICATION

This is a continuation application based on PCT application No. PCT/JP2012/080023 filed on Nov. 20, 2012, which claims the benefit of priority from Japanese Patent Application No. 2011-260629 filed on Nov. 29, 2011, the entire contents of which are incorporated by reference herein.

BACKGROUND

The present invention relates to an image pickup device.

A technology in which a communication device is added to an image pickup device such as a digital camera has been known. For example, a lens device in which an antenna is arranged within an electrically insulated region is disclosed in Patent Literature 1 (Japanese Patent Application Laid-Open Publication No. 2011-139242). By arranging the antenna within the electrically insulated region, it is possible for the antenna to obtain favorable communication characteristics without being affected by metal interfering with antenna characteristics.

However, since size reduction of image pickup devices has progressed recently, when a user grips the image pickup device, most of the image pickup device is covered by the hand of the user. Thus, there is a problem that an antenna portion provided on the image pickup device is covered by the hand of the user, which lowers a communication quality.

In the lens device described in Patent Literature 1, while protection of the antenna from an influence of metal constituting the lens device is disclosed, no measure is disclosed against covering of the antenna by the hand of the user.

SUMMARY

The present invention is made in view of the above-described problem and has an object to provide an image pickup device which can prevent deterioration of the communication quality.

According to one aspect of the present invention, there is an image pickup device including: a communication module having a substrate, an antenna provided on the substrate, and a processing circuit provided on the substrate and processing a signal transmitted/received by the antenna; a housing configured to accommodate a lens unit having a lens barrel and the communication module; and a grip belt configured to extend from a first attaching portion provided on a first side surface of the housing to a second attaching portion provided on a side opposite to an opening portion side of the lens barrel of the housing, wherein the communication module is arranged closer to the opening portion of the lens barrel than a reference surface substantially orthogonal to an optical axis of the lens barrel and passing through the first attaching portion or in the vicinity of the reference surface.

According to the present invention, an image pickup device which can prevent deterioration of a communication quality can be provided.

BRIEF DESCRIPTION OF THE DRAWINGS

FIG. 7 is a partial enlarged view illustrating the internal constitution of the image pickup device according to the embodiment.

DETAILED DESCRIPTION

Figure 1:
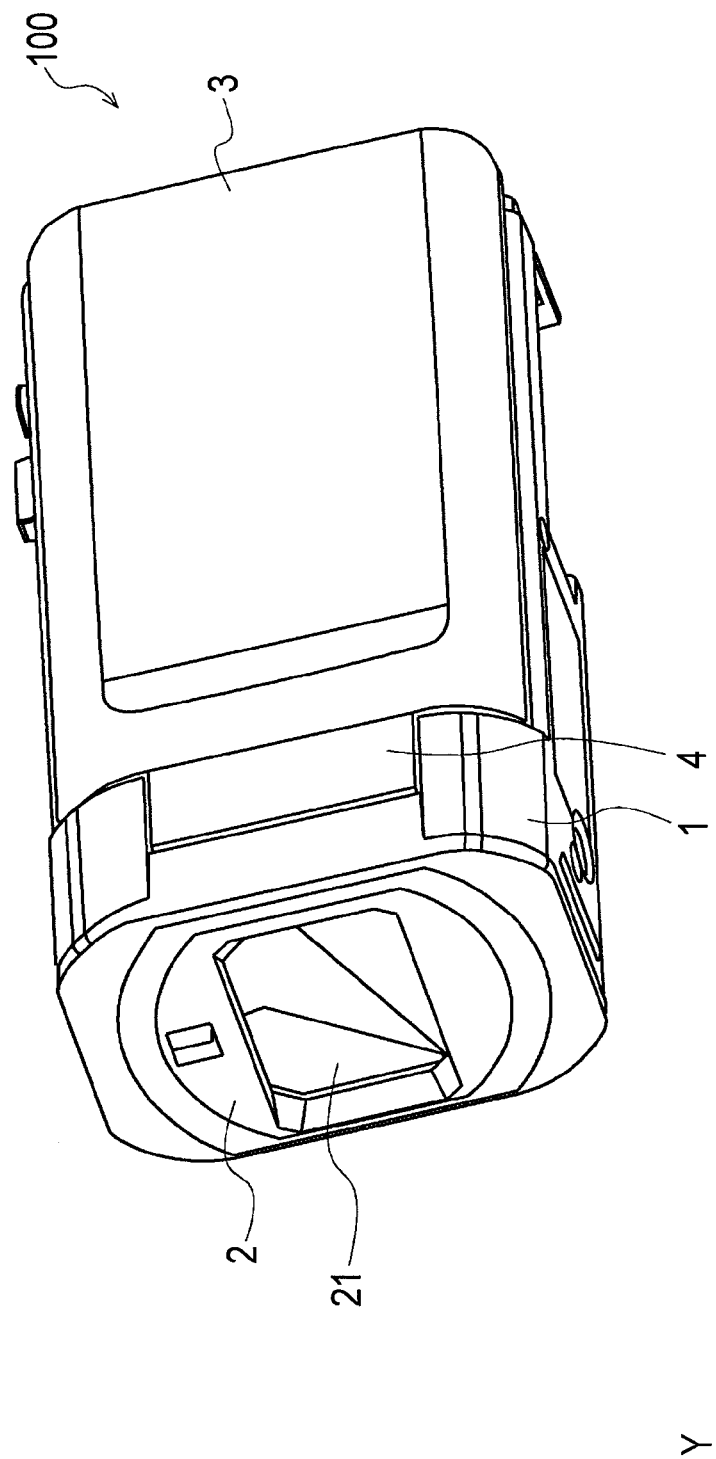
FIG. 1 is an appearance perspective view of an image pickup device according to an embodiment.
Figure 2:
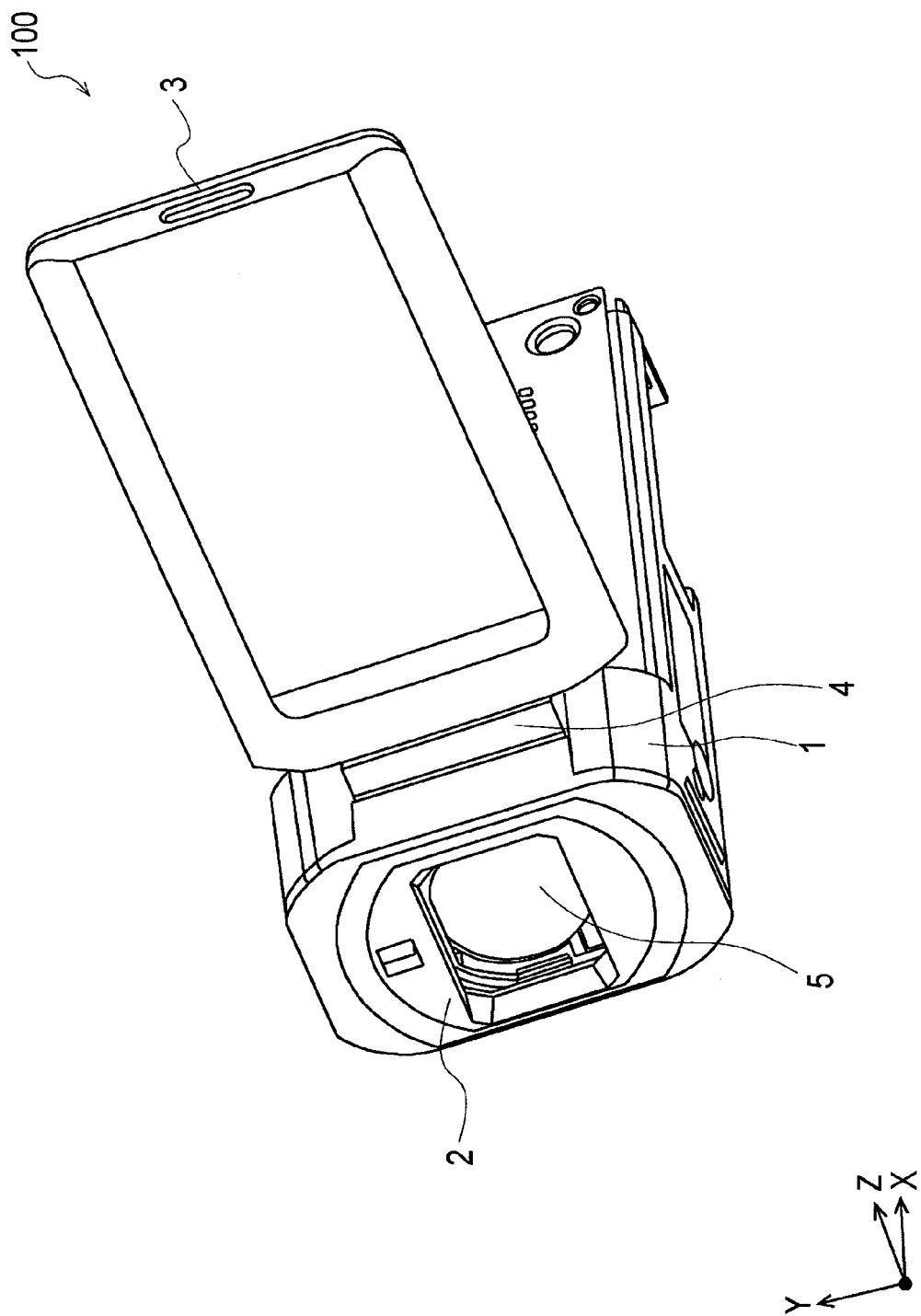
FIG. 2 is an appearance perspective view of the image pickup device according to the embodiment.
Figure 3:
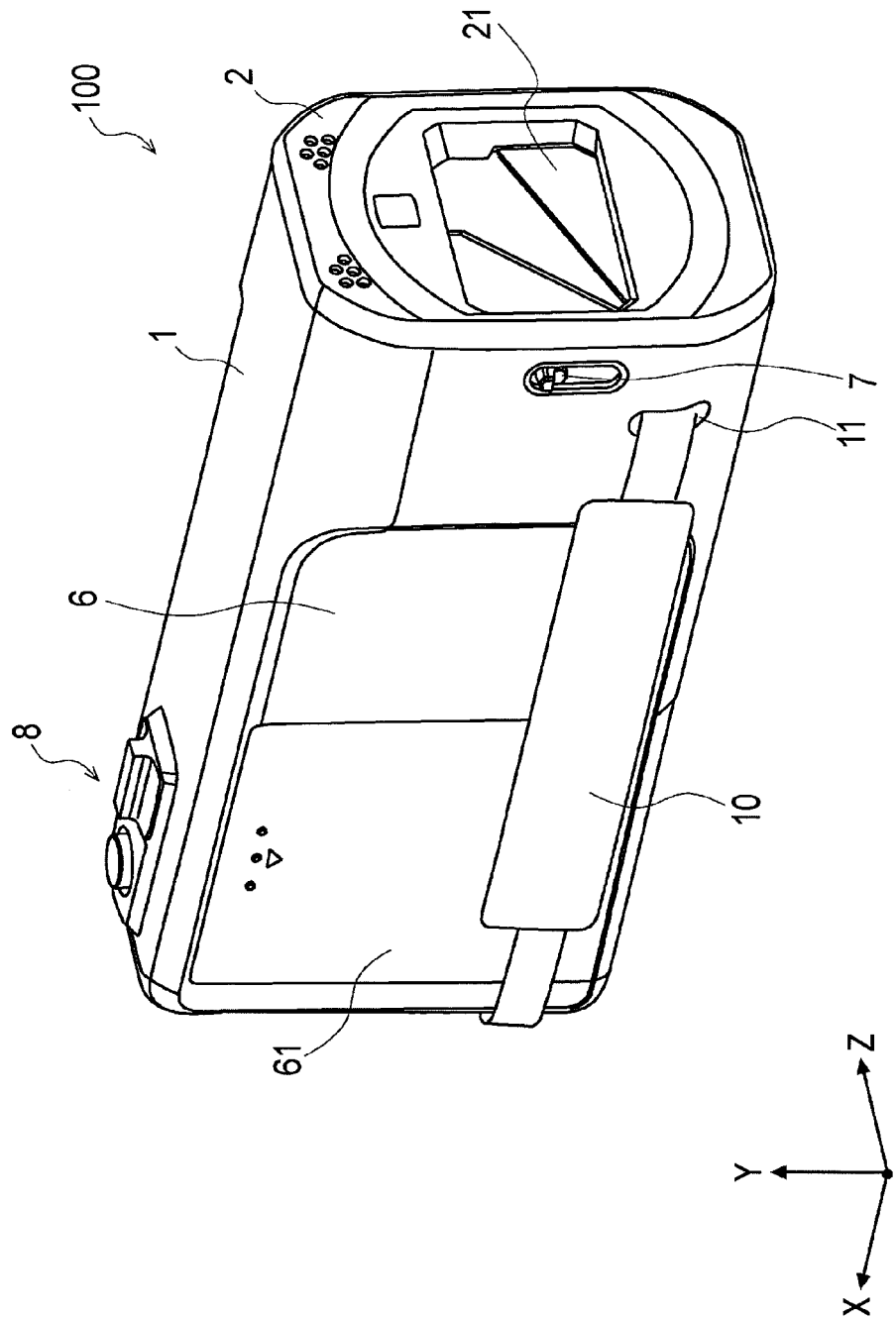
FIG. 3 is an appearance perspective view of the image pickup device according to the embodiment.

An embodiment of the present invention will be described below by referring to the attached drawings. FIGS. 1 to 3 are perspective views illustrating an entire configuration of an image pickup device 100 according to the present embodiment. For clarification of the explanation, the explanation will be made by using an x-y-z orthogonal coordinate system as illustrated.

Here, the x-axis indicates a longitudinal direction of the image pickup device 100, the y-axis indicates a vertical direction (perpendicular direction) of the image pickup device 100, and the z-axis indicates a horizontal direction (lateral direction or width direction) of the image pickup device 100. That is, the x-direction is a direction in parallel with an optical axis of a lens provided in the image pickup device 100, and the y-direction and the z-direction are directions perpendicular to the optical axis of the lens provided in the image pickup device 100. Moreover, a direction is specified on the basis of a user who grips the image pickup device 100. That is, a +x side is a rear side (side opposite to an opening portion side of a lens barrel), a −x side is a front side (the opening portion side of the lens barrel), a +y side is an upper side, a −y side is a lower side, a +z side is a left side, and a −z side is a right side. It is needless to say that the above-described directions are relative and are changed in accordance with an orientation of the image pickup device 100.

As illustrated in FIGS. 1 and 2, the image pickup device 100 includes a body case 1, a front cover 2, a monitor portion 3, and a hinge 4. On a front end of the body case 1, the front cover 2 is attached. In FIG. 1, a lens barrier 21 provided in the front cover 2 is in a closed state. In FIG. 2, the lens barrier 21 is in an open state. The body case 1 is a housing for accommodating a lens unit having a plurality of lenses, an image pickup element, a battery, a Wi-Fi module and the like.

Moreover, on a left side surface (second side surface) of the body case 1, the monitor portion 3 is provided. The monitor portion 3 is connected to the body case 1 through the hinge 4. The monitor portion 3 has a liquid crystal display for displaying a subject, stored image data, set information and other types of information. For example, when the user opens the monitor portion 3 for image pickup, power is turned on. As a result, as illustrated in FIG. 2, the lens barrier 21 is brought into the open state. When the lens barrier 21 is in the open state, a lens 5 is exposed through the opening portion provided in the front cover 2. As a result, the image pickup device 100 becomes capable of image pickup. In the state in which the monitor portion 3 is open, a monitor of the monitor portion 3 is arranged facing the rear side, that is, the user side.

The lens 5 guides outside light to the image pickup element in the image pickup device 100. The image pickup device 100 receives the light transmitted through the lens 5 and picks up an image of the subject.

FIG. 3 is a perspective view when seen from a right side surface (first side surface) facing the left side surface of the image pickup device 100 illustrated in FIGS. 1 and 2. The image pickup device 100 includes a grip portion 6, a protruding piece 7, an operation portion 8, and a grip belt 10. The grip portion 6 is a portion for gripping the image pickup device 100 by the user with the hand (right hand). On a part of the grip portion 6, a battery cover 61 is arranged. Inside the battery cover 61, a battery is mounted. The battery supplies power to the monitor portion 3 and the image pickup element of the image pickup device 100.

The protruding piece 7 protrudes from the body case 1 in a width direction (right direction). When the lens barrier 21 is to be changed from the open state to the closed state, the user manipulates the protruding piece 7. As a result, the lens barrier 21 is changed from the open state to the closed state.

The operation portion 8 is provided on an end portion in the rear (on a side opposite to the opening portion side of the lens barrel) on an upper surface of the body case 1. The operation portion 8 includes a button, a lever and the like and receives operations according to various instructions such as a shutter operation, a zoom operation and others. If a touch panel function is provided, the display of the monitor portion 3 becomes a part of the operation portion. Moreover, an arrangement position of the operation portion 8 is not limited to the rear end portion on the upper surface of the body case 1.

The grip belt 10 extends on the right side surface of the image pickup device 100. The grip belt 10 holds the hand of the user who grips the grip portion 6. One end of the grip belt 10 is attached to the first attaching portion 11 provided on the right side surface of the body case 1. On the other hand, the other end of the grip belt 10 is attached to the second attaching portion (not shown) provided on the rear end portion of the body case 1. The first attaching portion 11 is provided on the front of the grip portion 6. In more detail, the first attaching portion 11 is arranged in front of the grip portion 6, in back of the protruding piece 7 and below the lens barrier 21 (lens 5). Positions of the first attaching portion 11 and the second attaching portion are not limited to the positions illustrated in FIG. 3. It is only necessary that the first attaching portion 11 and the second attaching portion are arranged at an interval so that the hand of the user can be placed between the first attaching portion 11 and the second attaching portion. For example, it is only necessary that the second attaching portion is provided on the rear side (the side opposite to the opening portion side of the lens barrel) of the body case 1 and it may be provided on the rear on the right side surface of the body case 1.

Figure 4:
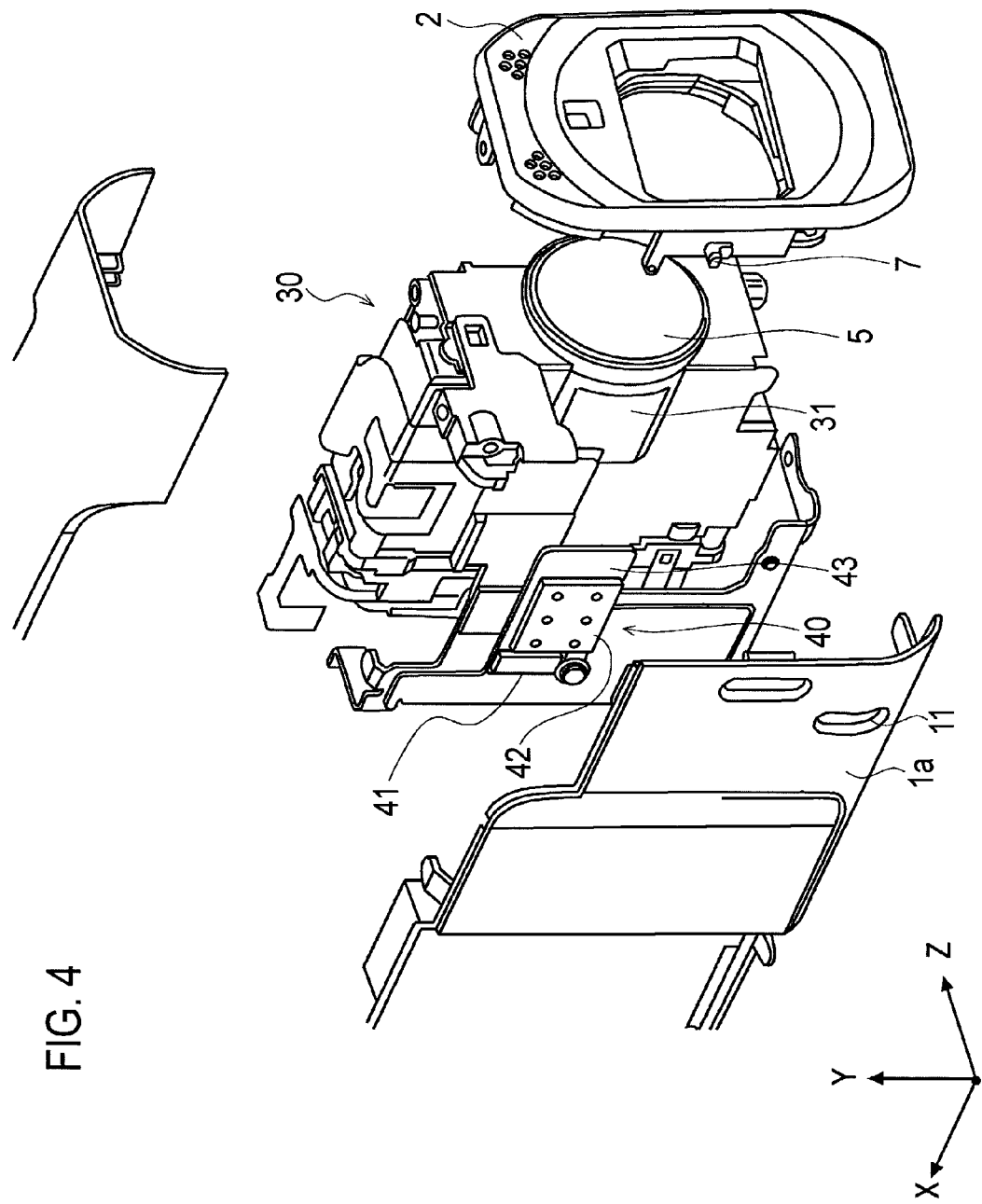
FIG. 4 is an exploded perspective view of the image pickup device according to an embodiment.

Subsequently, by using an exploded perspective view illustrated in FIG. 4, an internal structure of the body case 1 will be described. On the rear of the front cover 2, a lens unit 30 is arranged. The lens unit 30 stores a barrel 31 having the lens 5 and a plurality of lenses, not shown. On the rear of the lens unit 30, an image pickup element, a control board, a battery and the like, not shown, are arranged.

A Wi-Fi module 40 (communication module) is arranged between the lens unit 30 and a right side surface 1a of the body case 1. The Wi-Fi module 40 is arranged on a side surface of the lens unit 30. In more detail, the Wi-Fi module 40 is positioned and fixed to the right side surface of the lens unit 30 by a screw or the like, for example. It is needless to say that the Wi-Fi module 40 may be attached directly to the lens unit 30 or may be attached through other components.

The Wi-Fi module 40 has a substrate 41, a processing circuit 42, and an antenna 43. The substrate 41 is arranged in parallel with the right side surface 1a. The processing circuit 42 is a circuit arranged on the substrate 41 and processing a signal transmitted/received by the antenna 43. The antenna 43 is a pattern antenna provided inside the substrate 41 and conducts transmission/reception of a signal with an external device. It is needless to say that the communication method is not limited to Wi-Fi, but various methods including Bluetooth (registered trademark) can be applied.

Figure 5:
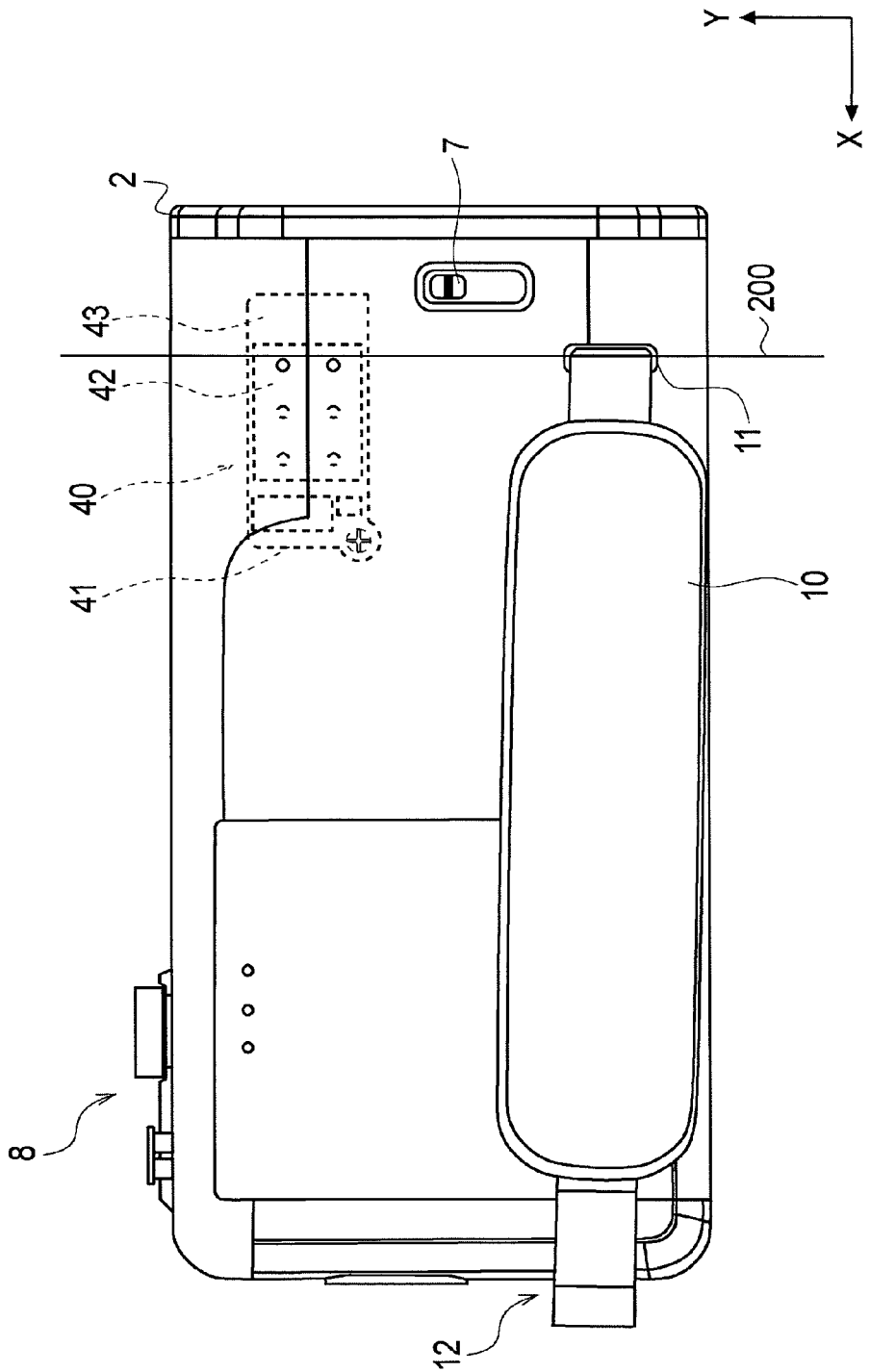
FIG. 5 is a side perspective view of the image pickup device according to the embodiment.
Figure 6:
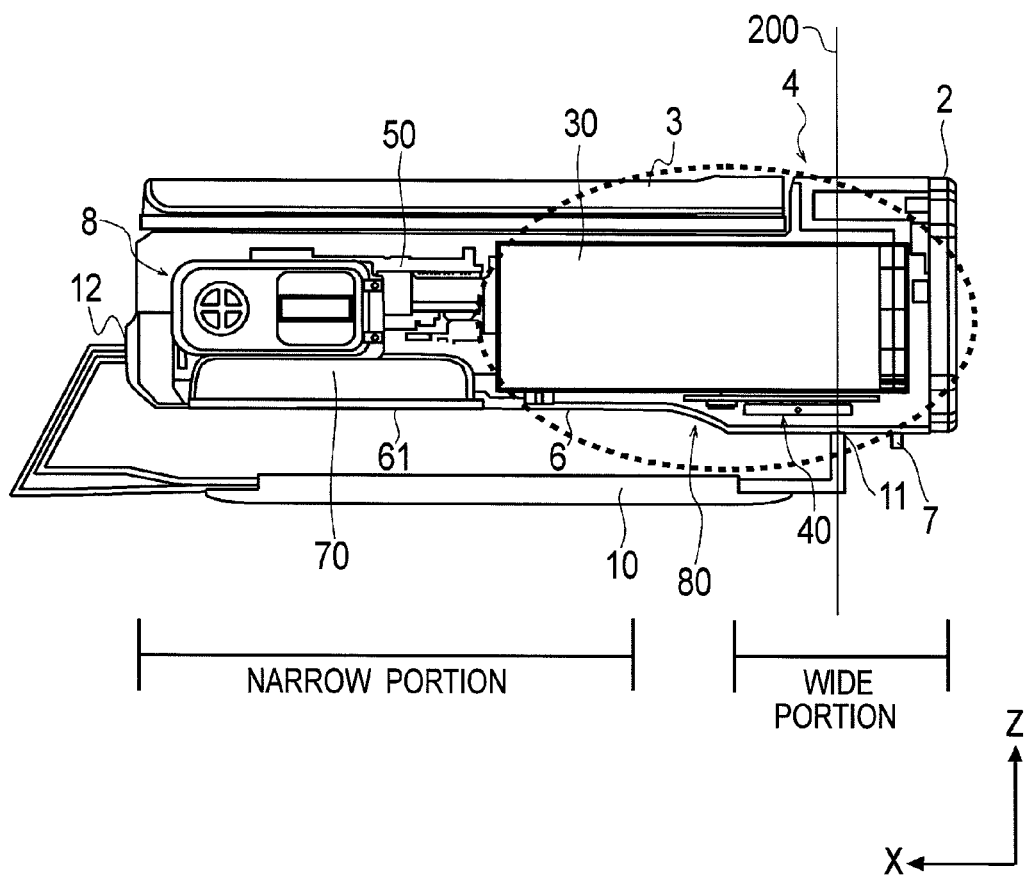
FIG. 6 is a diagram illustrating an internal constitution of the image pickup device according to the embodiment.

Subsequently, by using FIGS. 5 to 7, an arrangement position of the Wi-Fi module 40 will be described in detail. FIG. 5 is a right side perspective view of the image pickup device 100. FIG. 6 is a diagram illustrating the internal structure of the image pickup device 100. FIG. 7 is an enlarged view of a portion surrounded by a broken line in FIG. 6. In FIGS. 6 and 7, the body case 1 is illustrated transparently. Moreover, in FIG. 5, for convenience of the explanation, as the internal structure of the body case 1, only the Wi-Fi module 40 is illustrated by a broken line. In FIGS. 5 and 6, the other end of the grip belt 10 is attached to the second attaching portion 12 provided on a rear side surface of the body case 1.

In back of the lens unit 30, the control board 50 for controlling the image pickup element and the monitor portion 3 is arranged, and a battery 70 is also arranged. The control board 50 extends on the left side surface of the body case 1 from the rear end portion of the lens unit 30 to the rear end portion of the body case 1. That is, inside the body case 1, the lens unit 30 and the control board 50 are placed in line in a direction of the optical axis (x-axis). The control board 50 may be arranged separately on a plurality of boards.

The battery 70 extends on the right side surface of the body case 1 from the rear end portion of the lens unit 30 to the rear end portion of the body case 1. That is, inside the body case 1, the lens unit 30 and the battery 70 are placed in line in the direction of the optical axis (x-axis).

On the right side surface of the body case 1, a stepped portion 80 for changing a width of the body case 1 is provided. Thus, in the body case 1, a rear portion (narrow portion) of the stepped portion 80 has a width in the z-axis direction (length in the lateral direction) smaller than a front portion (wide portion) of the stepped portion 80. In other words, the narrow portion and the wide portion form the stepped portion 80. A right side surface of the narrow portion is the grip portion 6. At the narrow portion, the control board 50 and the battery 70 are stored. The lens unit 30 extends from the wide portion to the narrow portion. The Wi-Fi module 40 is stored in the wide portion. That is, the Wi-Fi module 40 is arranged in front of the grip portion 6. At this time, since the user grips the narrow portion (grip portion 6), covering of the antenna 43 stored in the wide portion by the user's hand can be avoided. The change in the width of the stepped portion 80 may be a smooth change (inclined shape) as illustrated in FIG. 5 or may be a rapid change (stepped shape).

The Wi-Fi module 40 is arranged on the right side of the lens unit 30 and above the first attaching portion 11 and the protruding piece 7. In other words, the Wi-Fi module 40 is arranged on the side of the lens barrel 31 provided in the lens unit 30.

That is, the Wi-Fi module 40 is arranged in the vicinity of a reference surface 200 substantially orthogonal to the optical axis (x-axis) of the lens barrel 31 and passing through the first attaching portion 11. In more detail, the processing circuit 42 of the Wi-Fi module 40 is arranged crossing the reference surface 200. Moreover, in the Wi-Fi module 40, the antenna 43 is arranged in front of the processing circuit 42. That is, the antenna 43 is arranged in front of the reference surface 200. In other words, the antenna 43 is arranged in front of the first attaching portion 11. It is needless to say that the Wi-Fi module 40 as a whole may be arranged in front of the reference surface 200.

It is only necessary that the Wi-Fi module 40 is arranged closer to the opening portion of the lens barrel 31 than the reference surface 200 or in the vicinity of the reference surface 200, and the arrangement position is not limited to the right side of the lens unit 30. For example, it may be on an upper side or a lower side of the lens unit 30. However, on the left side of the lens unit 30, since the hinge 4 is present in the vicinity of the reference surface 200, the Wi-Fi module 40 cannot be arranged. Therefore, it is only necessary that the Wi-Fi module 40 is arranged in a position other than a space between the left side surface of the body case 1 and the lens unit 30.

As described above, according to the configuration of the image pickup device 100 according to the present embodiment, the antenna 43 of the Wi-Fi module 40 is arranged in front of the reference surface 200. In other words, the antenna 43 is arranged in front of the first attaching portion 11 (end portion of the grip belt 10). At this time, the hand of the user does not grip a region which is positioned in front of the first attaching portion 11. Thus, the hand of the user can be prevented from covering the antenna 43. Therefore, deterioration of the communication quality of the Wi-Fi module 40 can be prevented.

The present invention is not limited to the above-described embodiment and is capable of appropriate changes and combinations within a range not departing from the gist. For example, the Wi-Fi module 40 does not necessarily have to be arranged in front of the reference surface 200, but it is only necessary that the Wi-Fi module 40 is arranged in the vicinity of the reference surface 200. As long as it is arranged in the vicinity of the reference surface 200, a portion of the antenna 43 covered by the hand of the user is small, and deterioration of the communication quality can be prevented.

What is claimed is:

1. An image pickup device comprising:
    a communication module having a substrate, an antenna provided on the substrate, and a processing circuit provided on the substrate and processing a signal transmitted/received by the antenna;
    a housing configured to accommodate a lens unit having a lens barrel and the communication module; and
    a grip belt configured to extend from a first attaching portion provided on a first side surface of the housing to a second attaching portion provided on a side opposite to an opening portion side of the lens barrel of the housing,
    wherein the communication module is arranged closer to the opening portion of the lens barrel than a reference surface substantially orthogonal to an optical axis of the lens barrel and passing through the first attaching portion or in the vicinity of the reference surface; wherein
    a stepped portion for changing a width between the first side surface and the second side surface of the housing is provided on the first side surface;
    the housing has a wide portion provided on the opening portion side of the lens barrel of the stepped portion, and a narrow portion provided on a side opposite to the opening portion side of the lens barrel of the stepped portion; and
    the communication module is arranged in the wide portion.

2. The image pickup device according to claim 1, wherein the antenna is arranged closer to the opening portion of the lens barrel than the processing circuit; and
    the processing circuit is arranged closer to the opening portion of the lens barrel than the reference surface or in the vicinity of the reference surface.

3. The image pickup device according to claim 1, further comprising a display portion capable of being opened and closed, provided on a second side surface facing the first side surface of the housing,
    wherein the communication module is arranged in a portion other than a space between the second side surface and the lens unit.

4. The image pickup device according to claim 1, wherein the antenna is provided on a side of the lens barrel.

5. The image pickup device according to claim 1, further comprising an operation portion provided on the side opposite to the opening portion side of the lens barrel of the housing.

* * * * *